(12) United States Patent
Renner (10) Patent No.: US 11,985,032 B2
(45) Date of Patent: May 14, 2024

(54) METADATA-AWARE TEMPLATING ENGINE FOR ASSIGNING INTERNET PROTOCOL ADDRESS SPACE IN AN ORGANIZATION

(71) Applicant: 6Connect, Inc., San Francisco, CA (US)

(72) Inventor: William R. Renner, Henrico, VA (US)

(73) Assignee: 6Connect, Inc, DE (US)

( * ) Notice: Subject to any disclaimer, the term of this patent is extended or adjusted under 35 U.S.C. 154(b) by 0 days.

(21) Appl. No.: 17/900,832

(22) Filed: Aug. 31, 2022

(65) Prior Publication Data

US 2024/0073091 A1    Feb. 29, 2024

(51) Int. Cl.
H04L 41/084    (2022.01)
H04L 41/12    (2022.01)
H04L 41/14    (2022.01)

(52) U.S. Cl.
CPC .......... *H04L 41/0843* (2013.01); *H04L 41/12* (2013.01); *H04L 41/145* (2013.01)

(58) Field of Classification Search
CPC .... H04L 41/0843; H04L 41/12; H04L 41/145
See application file for complete search history.

(56) References Cited

U.S. PATENT DOCUMENTS

| | | |
|---|---|---|
| 8,037,164 B2 | 10/2011 | Draca et al. |
| 8,131,992 B2 | 3/2012 | Ennis, Jr. et al. |
| 8,259,571 B1 | 9/2012 | Raphel et al. |
| 8,464,265 B2 | 6/2013 | Worley |
| 8,775,629 B1 | 7/2014 | Whittle |
| 8,862,725 B1 | 10/2014 | Voltmer et al. |
| 8,862,735 B1 | 10/2014 | Singh et al. |
| 8,886,788 B2 | 11/2014 | Tung et al. |
| 9,124,633 B1 | 9/2015 | Eizadi et al. |
| 9,264,397 B2 | 2/2016 | Meyer et al. |
| 9,300,541 B2 | 3/2016 | Danforth et al. |
| 9,350,710 B2 | 5/2016 | Herle et al. |
| 9,430,295 B1 | 8/2016 | Eizadi et al. |
| 9,680,711 B2 | 6/2017 | Hruska et al. |
| 9,692,748 B2 | 6/2017 | Maheshwari et al. |
| 10,122,596 B2 | 11/2018 | Mordani et al. |
| 10,164,938 B2 | 12/2018 | Eckert et al. |
| 10,205,701 B1 | 2/2019 | Voss et al. |
| 10,250,451 B1 | 4/2019 | Moghe et al. |

(Continued)

*Primary Examiner* — Zi Ye
*Assistant Examiner* — Zia Khurshid
(74) *Attorney, Agent, or Firm* — Mark Protsik; Thomas Schneck (57) ABSTRACT

A templating engine in a network management platform creates and stores named templates that describe a network state associating one or more IP address blocks and sub-blocks with one or more corresponding attributes of potential and actual network resources. Named templates comprise, for each IP address sub-block, a data object including a set of actions to be taken in response to provisioning requests based on metadata associated with a network resource identified by the request. Responsive to a provisioning request for access by a resource to the enterprise network, an executed template automatically assigns an IP address to that resource in one of the sub-blocks according to identified attributes of the resource. The executing template automatically notifies external systems of the IP address assignment of the enterprise network.

17 Claims, 3 Drawing Sheets

(56) References Cited

U.S. PATENT DOCUMENTS

| | | | |
|---|---|---|---|
| 10,250,555 | B2 | 4/2019 | Krzywonos et al. |
| 10,652,207 | B2 | 5/2020 | Voss et al. |
| 10,785,158 | B1 | 9/2020 | Chen et al. |
| 11,005,811 | B2 | 5/2021 | Grinius et al. |
| 11,032,239 | B1 | 6/2021 | Maria et al. |
| 11,171,825 | B2 | 11/2021 | Weldemariam et al. |
| 11,178,065 | B2 | 11/2021 | Ignotyev |
| 2016/0132214 | A1* | 5/2016 | Koushik .................. G06F 8/61 715/741 |
| 2016/0164825 | A1 | 6/2016 | Riedel et al. |
| 2020/0274766 | A1* | 8/2020 | Notari ................ H04L 41/0672 |

* cited by examiner

METADATA-AWARE TEMPLATING ENGINE FOR ASSIGNING INTERNET PROTOCOL ADDRESS SPACE IN AN ORGANIZATION

TECHNICAL FIELD

The present invention relates to network maintenance, administration, and management systems, and more particularly to IP address allocating, assigning, registering, and configuring arrangements and protocols that accord with a hierarchical network topology or plan of an organization.

BACKGROUND ART

The routine work of monitoring and maintaining large numbers of networked computers and related network resources has been increasingly automated to minimize labor, time, and human error. Faced with a growing complexity of network infrastructure and the increased use of mobile and virtual network resources, enterprises have outgrown manual approaches and platforms for network provisioning, which are labor-intensive, inefficient and error prone. A foundation of this automation is network consistency. All automated networks must be laid out according to some well-formed plan, and as organizations struggle with an increasingly complex technological landscape these plans can become difficult to express, and even more difficult to implement correctly. Given that even a small error can introduce unacceptable variance into the resulting network topology, with consequent service interruptions and general loss of throughput, it is desirable to fully templatize the process by which Internet Protocol (IP) subnets are divided, sub-divided, and distributed to meet an organization's requirements. Correctly deployed, an automated provisioning platform will allocate network resources based on policies defined by enterprise network architects, rather than ad hoc, and be less error prone. To date, no tooling adequately solves this problem.

U.S. Pat. No. 7,623,547 to Dooley et al. describes one basic IP address management (IPAM) system that can allocate IP address blocks or portions thereof among data containers in a container hierarchy according to container policies. Here the system has features that are meant to facilitate the transition from IP version 4 to IP version 6, where each data container stores address blocks of both versions, and a topology module creates container policies with specified attributes for managing the address blocks and for linking additional data containers. An IP address manager or management module is configured to create additional address blocks with specified attributes and allocate them as needed to data containers in the container hierarchy. Accordingly, networks can support both versions of the IP protocol running in parallel.

U.S. Pat. No. 8,862,735 to Singh et al. describes an IP address management system for an enterprise network that allows users to configure Domain Name System (DNS) zones and Dynamic Host Configuration Protocol (DHCP) scopes, and to update configurations of multiple DHCP servers. It sets out a basic IP addressing method.

U.S. Pat. No. 8,775,629 to Whittle describes a system for managing an IP address space for an enterprise network that focuses upon techniques for graphically organizing networks by multiple criteria for IPAM network migrations to allocate and assign new network addresses with associated attributes to the various subnets of the network, where the allocations are based on contiguous (IPv4 to IPv6) network address allocation criteria.

U.S. Pat. No. 9,680,711 to Hruska et al. describes a method and apparatus for visualizing, that is displaying a visual representation of, DHCP subnet scopes for a range of IP addresses. It displays IP block states and metrics (e.g., percent allocated versus percent free) for multiple ranges of IP addresses. (For example, if an IP block is 40% used and in a standardized display a full subnet is 100 pixels long, then it could display usage by a bar that is 40 pixels long.) This enables one to easily compare the usage state of various blocks visually.

U.S. Pat. No. 10,164,938 to Eckert et al. describes a method and apparatus for topology-aware addressing of reconfigurable networks. An addressing agent relates a static IP addressing scheme and the topology of a particular network to collaboratively assign dynamic IP addresses to application-based devices according to their current physical location and type. This allows an application server in collaboration with a DHCP server to manage one or more devices based on the static IP addressing scheme regardless of which particular application-based device of a particular type is in a particular physical location without needing to manually reconfigure the network whenever the topology changes. For example, this would be useful in wireless mobile ad-hoc networks where the physical locations of mobile devices are continually changing and need dynamic IP addresses to maintain network access. But it is disclosed to be generally useful for any reconfigurable network. However, methods for updating or otherwise changing the static IP addressing scheme itself (the underlying fundamental mappings of IP addresses to specific device types and physical locations) are not described in this document.

In U.S. Pat. No. 10,205,701 to Voss et al., a system for cloud network automation of IP address and DNS record management is described. Cloud requests related to a physical or virtual resource indicate whether the resource is to be newly added to a cloud environment, deleted from the cloud environment, or be a modified resource in the cloud environment. When a cloud request from a global cloud manager is received by a cloud platform appliance, it determines whether it or some other cloud platform appliance is locally authorized to process the request based on the IP address space and DNS record space it has been assigned to manage (in an access control list). If neither it nor another identifiable platform is found to process the request, it will proxy the request to a grid master, which maintains a centralized data store of IPAM, DNS and DHCP data of the grid for processing such requests.

A core problem is that human beings make mistakes, and this is especially true when dealing with IP addresses, which are long alphanumeric strings that are easily typed incorrectly. Unfortunately, the ease of error has no correlation to the impact of error, and a wrong IP address in the wrong place can cause unplanned downtime and possibly violate clauses of service agreements, all resulting merely from a single typo. Assigned IP space in an organization's network should always conform to an overall plan and the possibility for human error when dealing with IP addresses should be minimized wherever possible. As organizations grow and become more complex, dividing up IP space in a standardized, uniform way is tricky and prone to error. IP administrators want an intuitive system that takes advantage of available metadata with respect to provisioning of network resources and allows them to easily visualize what will happen without having to think too much or have a chance to mess up resource assignments inconsistent with the organization's overall hierarchical plan for the network.

SUMMARY DISCLOSURE

The present invention is a metadata-aware templating engine for assigning small blocks of IP addresses based on how users describe what specific sort of metadata is required so that the assigned IP space in an organization conforms to an overall plan. The system automatically notifies external systems once the assignment has completed, minimizing the possibility of human error when dealing with IP addresses. The templating process contemplated here is a means by which an IP architect can fully describe a set of complex relationships between customer data objects, IP data objects, and external services. The templating engine creates a named template that can be reliably executed by either individuals with limited or no understanding of the underlying mechanics or by automated network actors. The templating process involves a recursive cycle of IP block selection, actions taken regarding the IP block, and the subdivision of the IP block until the complete desired network state is described by the named template. Once so described, that template can be invoked in whole by means of a name or other identifier. This tool enables IP administrators to plan out the IP structure of their organizations in detail and put automation in place so that pesky users (local IT managers) with limited understanding don't even have a chance to make a mess of it.

DETAILED DESCRIPTION

The automated network provisioning and control system of the present invention is a dynamic network management platform that operates at the Application Programming Interface (API) level to automate the provisioning, configuration, and control of devices across distributed networks of any of a wide variety of infrastructure types (integrated DNS+DHCP+IPAM (DDI), Regional Internet Registries (RIR), Operations Support System (OSS)/Business Support System (BSS), Wide Area Network (WAN)/Local Area Network (LAN), Software-Defined Network (SDN)/Network Functions Virtualization (NFV), Infrastructure as a Service (IaaS), Cloud, etc.) present in datacenters around the world. The API provides easy integration and automates network provisioning workflows and can work from the cloud or behind a firewall. A network management platform in accord with the present invention includes a templating engine software tool that allows for creation of Templates as part of an enterprise's overall network plan developed by one or more IP Administrator(s) that can be subsequently used in a far less error-prone manner by local IT managers in their executing of network resource requests.

Figure 1:
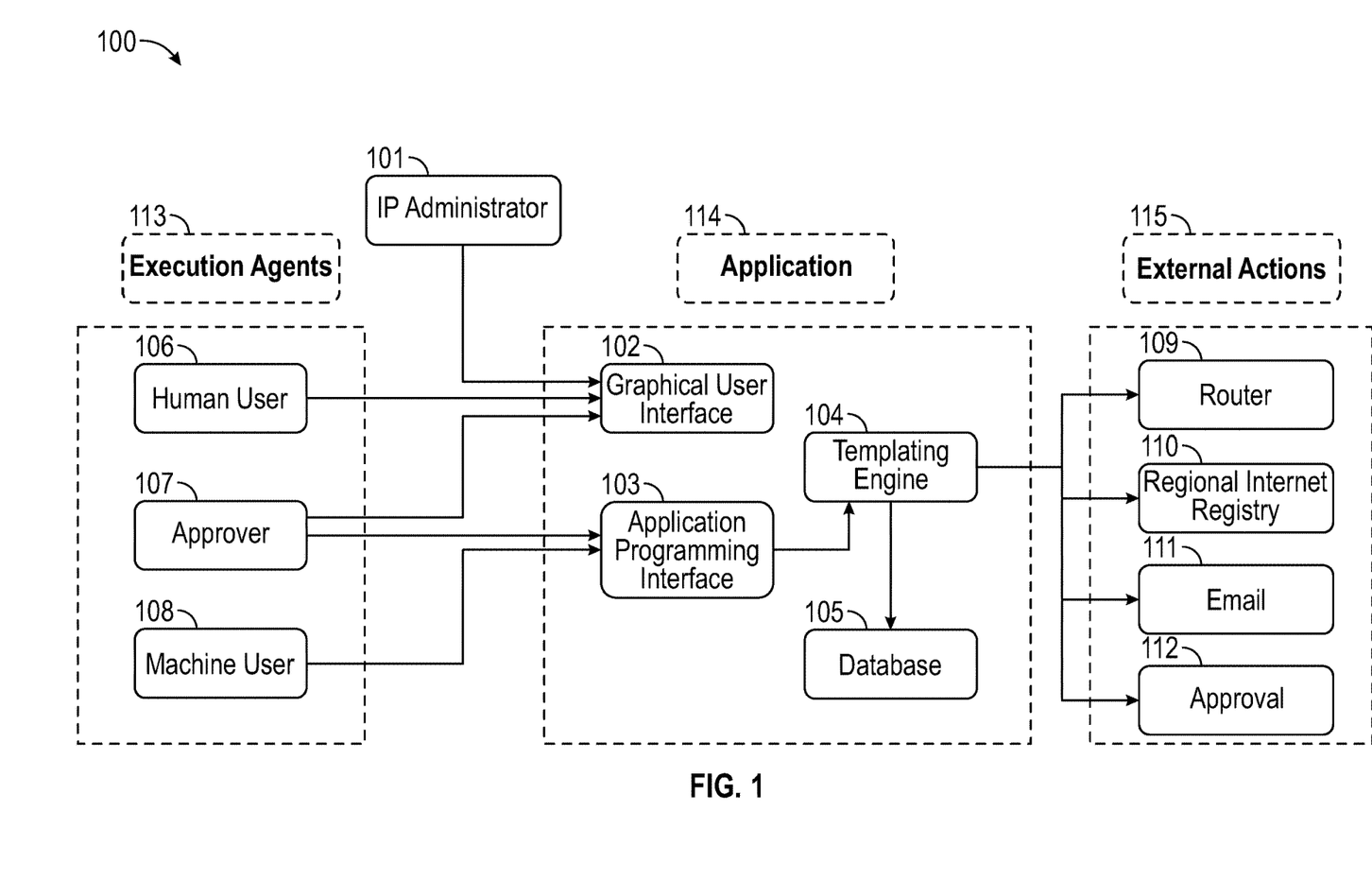
FIG. 1 is a schematic block diagram showing an overview of a network management platform having a templating engine in accord with the present invention.

With reference to FIG. 1, a network management platform is overseen by an IP administrator 101, who accesses the templating engine 104 for the purpose of creating one or more named network templates to be stored in a database 105. (As used here, the IP administrator 101 need not be, and usually is not, a single individual, but part of an organization's network administration team. That team provides oversight of the organization's entire network by creating a network topology plan, of which the templates form an integral part.) Other, usually more local, agents 113 within the network invoke and execute the templates created by the IP administrator 101 in response to provisioning requests for assigning IP space in the network. These execution agents 113 may include both human users 106 and machine users 108, as well as approvers 107 that permit the use of the templates by authenticated agents 106 and 108. The IP administrator 101 and human users and approvers 106 and 107 all benefit from having a graphical user interface (GUI) 102 by which to interact with the templating engine 104 and the named templates created by that engine 104 that are saved in database 105. Machine approvers and users 107 and 108 do not need a GUI 102, but rather interact with the templating engine 104 via an application programming interface (API) 103. The GUI 102, API 103, templating engine 104, and database 105 collectively form a software application 114 that serves as an intermediary between the various users 101 and 106-108 and the rest of the network by performing various external actions 115 when a named template is invoked and executed. These actions 115 can include network communications with or through routers 109 (e.g., updating routing tables), Regional Internet Registries (RIRs) 110, email 111, and negotiating any needed network approval processes 112. The external actions 115 are automated according to actions embedded by the IP administrator 101 within the template(s) to minimize human error in the provisioning of network resources.

Figure 3:
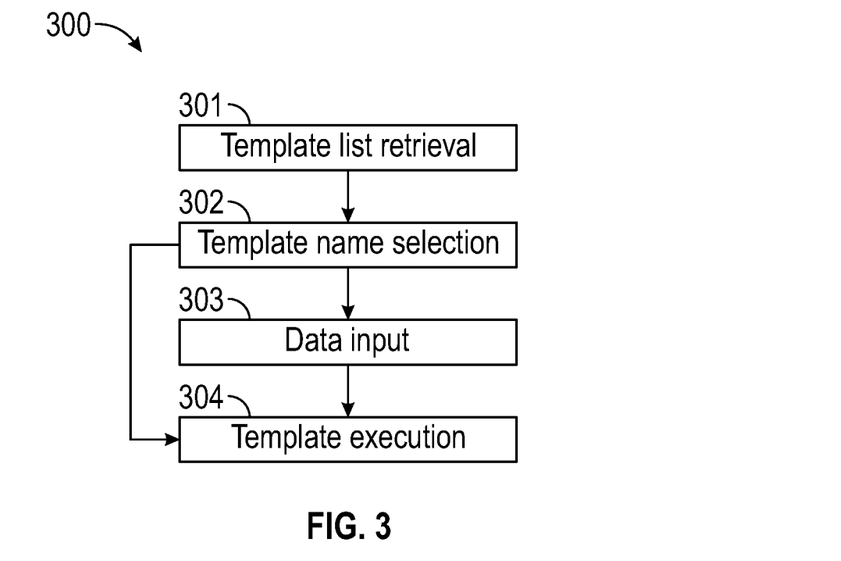
FIGS. 3 and 4 are flow diagrams of respective human-driven and computer-driven Template execution processes using the Templates created by the process of FIG. 2 and executed by the network management platform with templating engine of the present invention.
Figure 4:
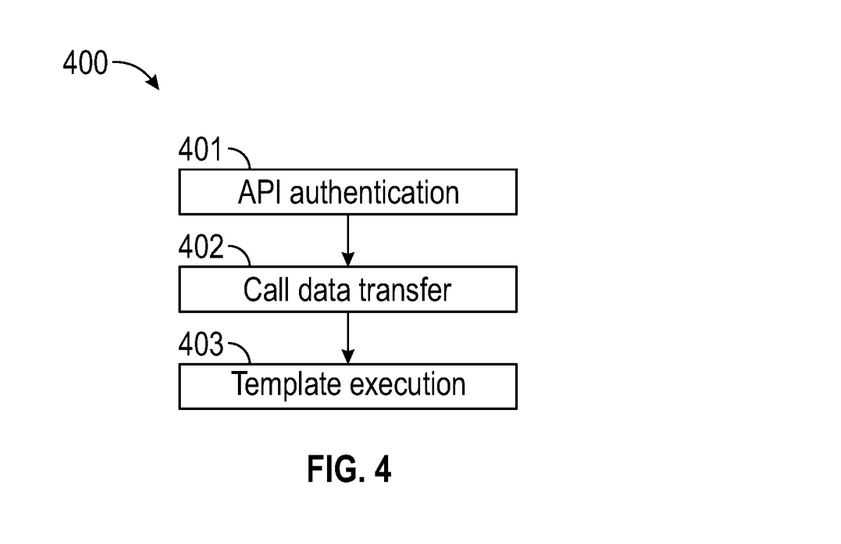

An automated network provisioning and control system includes a templating engine software tool that facilitates a templating process, in which a series of layered actions and relationships can be described by an IP Administrator as instructions to customize yet-to-be-specified IP space according to an overall plan for a network. The format in which these instructions are stored is a Template. The full Templating process has two main steps: the creation of this Template by the IP Administrator (FIG. 2) and the execution of the Template by local IT managers (FIGS. 3 and 4).

Figure 2:
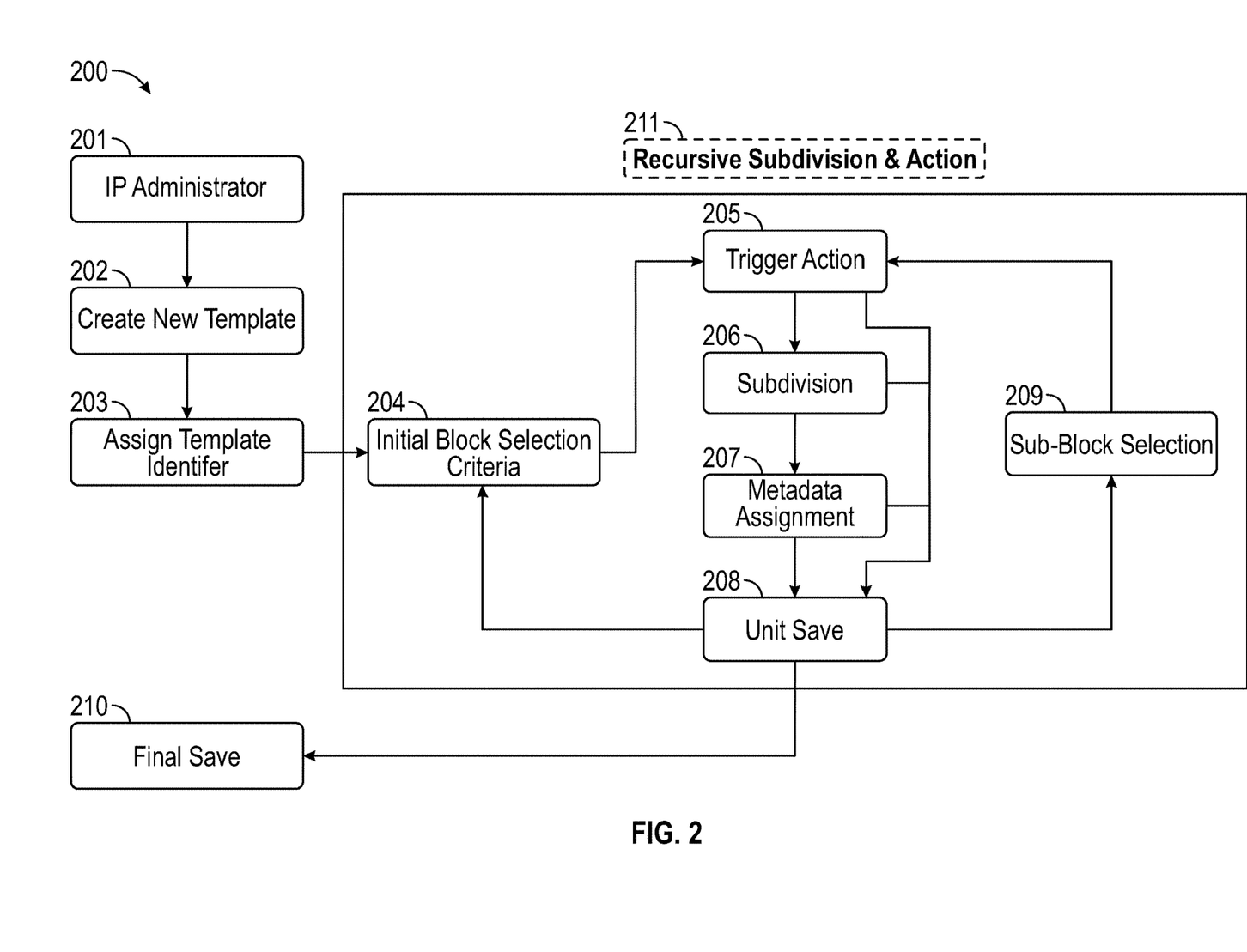
FIG. 2 is a flow diagram of a Template creation process implemented in a network management platform having metadata-aware templating engine of the present invention.

Template Creation:

FIG. 2 describes a Template creation process by which a complete data object is created to store all the information required in the Template to be executed later. The precise format (JSON, XML, verbose text, etc.) in which this data is stored is unimportant. It is the contents and the process by which they are composed that matter. First, an IP Administrator 201, using the templating engine software tool provided with the network provisioning system, moves to create a new Template 202, and assigns it a new identifier 203. So, in steps 202 and 203, an unpopulated template is created and named. At this time, additional metadata information can also be assigned, including but not limited to ID, name, shorthand name, owner-ID, or other Template-identifying characteristics. Once the template has been properly identified, the templating proceeds to a main recursive loop 211.

The main recursive loop 211 contains three primary steps. The first step establishes the initial block selection criteria 204. The second main step 205-207 is to enter any actions to be performed on the selected IP block. Third, the selection-action bundle is saved as a unit 208, and if not yet complete returned 209 for further subdivision.

In the block selection criteria step 204, the IP administrator 201 describes the IP range they would like to start with. This description can require any combination of data including but not limited to the size of the range, the current customer associated with the range, IP metadata (such as tags, regions, customer assignment information, availability status, IP version, creation or availability date, etc.), that it belongs to a specific supernet, or that it is a specific IP range.

More specifically, the user describes a first IP range upon which to work 204, e.g., by supplying an exact IP range or by describing the attributes that the desired range might have. For example, the user might want to work with exactly "192.168.20.0/24", and that will be entered as the base block. Alternatively, they may say "I want some IP block of size /20, tagged with 'ARIN' and 'Customer', which is currently Available." The specific parameters available as part of templating system will vary with implementation. The key idea is that the system will either be supplied with an exact IP range or the instructions by which an appropriate IP Range can be found.

Once the Initial Block Selection Criteria 204 is established, the process proceeds to a series of steps 205-207 describing what should be done with the selected IP block. The IP Administrator enters what actions 205-207, if any, to perform on the selected IP block. The number and nature of the available options will vary depending on the specific implementation of the templating engine, but the key idea is that some set of operations will be laid out which will then be followed later. Examples of this include, but are not limited to, triggered notification of external systems 205, automatic sub-division of this block 206, and metadata customization of any resulting part 207. If other steps not expressly mentioned are desired (for example, securing managerial approvals or cross-verifying IP block suitability) the availability of these steps should be taken as implied. The result is a data object that contains all information required for the successful execution of said Template. In practice, "all information required" varies substantially between environments. These steps 205-207 will vary both between different Templates and between different Templating implementations. Some examples are described below.

It is possible the process will describe some number of Trigger Actions 205 that are to be taken. Examples would be notifying the relevant Regional Internet Registry, a particular router, or a financial/billing department. This step may also serve as a validation layer for the selected IP block.

It is also possible the process will describe some number of Subdivision steps 206, whereby a large IP block is divided into smaller IP blocks or individual IPs. This allows a larger IP space to be split into several pieces and earmarked for specific future use.

It is also possible the process will describe some number of Metadata Assignment steps 207 whereby metadata (name, ID, tagging information, customer association information, billing IDs, etc.) is added, updated, or erased on either the IP block selected by the Selection Criteria 204 (or by the smaller blocks produced by the Subdivision step 206.

Finally, after all the necessary information for the selection of the IP Block has been gathered 204, and all the information necessary to execute the desired actions 205-207 upon that IP, the user will save 208 this complete selection-action bundle as a Unit. The bundle of data which results from the list of initial selection criteria 204 and the actions 205-207 to be taken upon it is referred to as a Unit. The Unit Actions are declared complete 208.

This leads the user to three choices. They may choose to add an additional, separate Unit by returning to the Initial Block Selection Criteria 204, or they can supply information to select a specific portion of the current IP range 209, or they can declare the Template complete and proceed to the final save 210 where the completed Template is assigned a unique identifier and committed to some storage medium for later use.

So, once the Actions are finalized 208 the system can recurse arbitrarily 209. This is a key feature of the Templating process. For example, if the execution of a Unit results in a customized, subdivided /20 of IPv4 space, then the IP Administrator can then create a new Sub-Unit 209 by describing some portion of this IP range they would like to work with next. This selection can be done in similar fashion to the initial block selection 204, but notably can also include relative indicators (ex: "first /22", or "second /28 from the end"). Once a starting position is selected, the IP Administrator can describe a new layer of actions 205-207 to be taken on this sub-range. Then, when this new Sub-Unit is saved 208, some portion of it can be sub-selected in turn, etc. The process can repeat with a single Unit being divided into as many Sub-Units as the IP Administrator requires, and with each Sub-Unit having in turn as many layered Sub-Units as are required.

For example, the IP Administrator can specify that the initial block must be a /20 of IPv4 space. This forms the initial Unit. The Administrator can then declare that the second and fourth /24s to be Sub-Units, and each of these Sub-Units to have special actions described for their first and last /28s. The end result is a system for selecting an IP block, performing a variety of Actions up on it, and then selecting one or more specific ranges within this block to perform some number of Actions upon them, and then continuing to select more and more specific ranges until all Actions are complete across the entire original /20 of IPv4 space.

After a Unit is described and completed 204-209, the IP Administrator can choose to add additional Units to this Template. They do this by returning to the initial block selection criteria step 204 and supplying criteria for the selection of an entirely new Unit. For example, the IP Administrator might require a Template that involves both IPv4 and IPv6 address space. In this case, they might first describe a Unit for the desired IPv4 block, add all its Sub-Units, and finalize it. Then they might create an entirely new Unit for the IPv6 block, and add all its Sub-Units, and then finalize it. Both Units are added to the Template and will be implemented when the Template is invoked.

There is no limitation on how many or how few Units might be employed in a single Template.

Once the IP Administrator has finalized the last Unit for a Template 208, they then declare the Template completely finished and save it for use 210. This concludes the Template creation process.

Template Execution:

Once a Template has been created by an enterprise's IP Administrator 101 and made available for use to the local IT managers in the enterprise, there are two main routes for it to be employed: by a human at a computer terminal (FIG. 3) or by another computer making requests over a network (FIG. 4).

FIG. 3 describes the human-driven Template execution process 300 from the perspective of a human user. This process 300 becomes available once at least one complete Template has been saved by the host system. The template execution process 300 begins with using some sort of communication software (a web browser, a command prompt, a ticketing system, email execution, etc.) to retrieve 301 a list of available Templates. So, a user begins the execution process by first retrieving a list of Template names 301. Once this list is retrieved 301, a specific Template is selected 302. Specifically, the user selects the identifier of the Template they would like to execute 302. A Template might require some set of initial conditions to be set by the user. Examples of this might be the name of a customer the user is working with, or a set of tags or other metadata to assist the IP block selection process in one or more of the specified Units 204. They then supply any base information required for the template to function 303 and send the command to the system. The system then executes the Template 304 and presents the results to the user. Progress, status, and result information is returned as needed.

FIG. 4 describes the computer-driven Template execution process 400 from the perspective of an external system calling this process from an API. This computer-driven process 400 begins with an external machine connecting by some method and authenticating itself with the Template system 401. The external system authenticates 401 against the Template service. Following successful authentication 401 of the connection, the external service then transfers 402 all data required to execute one or more Templates. The external machine passes a bundle of data 402 including which Template it wants to execute as well as any metadata that might be required to assist in the IP block selection process conducted by each Unit 204. Following the transfer and validation of this information, the Template(s) are then executed 403 by the Templating system. Progress, status, and result information is returned as needed.

Alternative Implementations:

There are many alternate implementations of the Templating system. As noted in the above sections, the specific Actions 205-207 that can be associated with a Unit or Sub-Unit 204 can vary widely depending on the needs of the organization. The key characterization of these steps is that they encompass all the possible things that might need to be done to an IP range to prepare it for use. This might include notifying a billing system, or verifying that the range is truly free, to cross-checking it against another system.

Several simplifications might be employed by other alternate implementations, such as hard coding several Actions or some of the metadata needed to select the starting block of each Unit. These choices would no longer be in the hands of the IP Administrator and instead be locked in place by the developer of the Templating implementation. Other ease-of-use features might include autosave on the completion of every Unit 208 or automatic naming 203 or identification assignment 202.

Likewise, there are many variations of the human-based Template execution process that might be employed. For instance, additional security checks might be employed to ensure that the user has the rights to execute a Template of given scope. Further, Template execution might be subject to review and approval and need to be preserved in some form prior to being deployed. It could also be that the individual executing the Template might have their options restricted so they have no option of retrieving the full Template list 301, or they might have their options restricted so that they can only supply certain metadata, or certain specific metadata options 303. This input might also be subject to validation checks.

Many of these concerns also apply to the machine-driven Template execution process (FIG. 4). The system could be implemented in such a way that certain metadata required by the Template is hard-coded or otherwise automatically supplied from another area. The system can also be implemented to validate or restrict any data being supplied to the Template 402. Review or approval might also be required before the request is fully authorized. Finally, there are a wide variety of techniques that might be employed to validate that a Template is executable-in-whole, including verifying that a suitable initial range exists for all Units, or that all blocks are properly reserved for this Template execution in environments where many actors might be performing work at once.

An automated network provisioning and control system with the templating engine of the present invention includes several important features. It is fully recursive, i.e., any level can be sub-divided with the same level of granularity as itself. If you have a large IP block and you divide it into several mid-sized blocks using various metadata and ordering techniques, you can then amend the plan so that any of those mid-sized blocks can be re-divided into small-sized blocks according to purpose (per the recursive loop 211 in FIG. 2). Those small blocks can themselves be re-divided into tiny blocks using the same techniques, etc. This feature gives the templating tool the ability to layout multi-level formats, with each allocation serving a purpose and (potentially) piped to a different external system connected to the enterprise network. Or one can just use it to keep everything neat, tidy, and standardized. Second, the templating engine involves the creation/deletion of network provisioning resources, to tie into the other automation features of platform. Template execution will automatically validate network resource assignments to ensure the total package is deployable before doing anything, and will auto-notify external systems once the assignment has completed (updating public RIR Registries, updating routing tables, updating GeoIP information, etc.) The Templates created and executed with this tool take advantage of all metadata features offered by the overall provisioning platform (e.g., tags, regions, metaX fields, resource assignment states).

What is claimed is:

1. In a computer-implemented system that provides an interactive platform for managing an enterprise network, a templating software engine running in a computer of the interactive platform for establishing and executing a hierarchical Internet Protocol (IP) addressing scheme in the form of at least one named template conforming to an overall network topology plan of an enterprise to effect changes in an enterprise network, comprising:

creating a named template using the tem plating engine, the named template describing a network state associating one or more IP address blocks and sub-blocks with one or more corresponding attributes of potential and actual network resources;

storing the named template in a database memory accessible by the interactive platform;

receiving a provisioning request for access by a resource to the enterprise network;

invoking a template by name from a retrieved template list in the database memory in response to the provisioning request, the template comprising for each sub-block a data object including a set of actions to be taken in response to provisioning requests based on metadata associated with a network resource identified by the request;

inputting metadata of the resource associated with the provisioning request as requested by the invoked template;

carrying out by the invoked template of the described set of actions in assigning an IP address to the resource; and responsive to the provisioning request received by the interactive platform for access by the resource to the enterprise network, automatically assigning by the named template being executed on the platform of an IP address to that resource in one of the sub-blocks according to identified attributes of the resource in external systems associated with the network of the IP address assignment, subdivision of the selected IP address block or sub block, assignment of metadata to the selected, securing managerial approvals of the IP address assignment, and cross-verifying of IP block suitability for the requesting network resource, the executing template also automatically notifying external systems of the IP address assignment of the enterprise network.

2. A templating engine in a system as in claim 1, wherein the named template comprises for each sub-block a data object including a set of actions to be taken in response to provisioning requests based on metadata associated with a network resource identified by the request.

3. A templating engine in a system as in claim 1, wherein creating the named template involves a recursive cycle of successive IP block selections, description of instructions for all actions to be taken regarding each selected IP block in response to provisioning requests, and subdivision of a selected IP block until a complete desired network state is described by the named template.

4. A templating engine in a system as in claim 1, wherein a named template stored in the database memory can be invoked by name by a local IT manager in response to a provisioning request.

5. A templating engine in a system as in claim 1, wherein a named template stored in the database memory can be invoked by name by an automated network actor in response to a provisioning request.

6. In a computer-implemented system that provides an interactive platform for managing an enterprise network, a method using a named template for executing a hierarchical Internet Protocol (IP) addressing scheme to provision network resources conforming to an overall network topology plan of an enterprise in response to provisioning requests, comprising:

receiving a provisioning request for access by a resource to the enterprise network;

invoking a template by name from a retrieved template list in a database memory in response to the provisioning request, the template comprising for each sub-block a data object including a set of actions to be taken in response to provisioning requests based on metadata associated with a network resource identified by the request;

inputting metadata of the resource associated with the provisioning request as requested by the invoked template; and carrying out by the invoked template of the described set of actions in assigning an IP address to the resource;

responsive to the provisioning request received by the interactive platform for access by the resource to the enterprise network, automatically assigning by the named template being executed on the platform of the IP address to that resource in one of the sub-blocks according to identified attributes of the resource in one or more of triggering notification of external systems associated with the network of an IP address assignment, subdivision of the selected IP address block or sub block, assignment of metadata to the selected, securing managerial approvals of the IP address assignment, and cross-verifying of IP block suitability for the requesting network resource, the executing template also automatically notifying external systems of the IP address assignment of the enterprise network.

7. A method of executing a named template in a system as in claim 6, wherein the template is invoked and metadata is input by a local IT manager in response to the provisioning request.

8. A method of executing a named template in a system as in claim 6, wherein the template is invoked and metadata is input by an automated network actor in response to the provisioning request.

9. A method of executing a named template in a system as in claim 8, wherein invoking the template is followed by an authentication of the automated network actor.

10. A method of executing a named template in a system as in claim 6, wherein the described set of actions include verifying that an IP address is unused and free to be assigned to the resource associated with the provisioning request.

11. A method of executing a named template in a system as in claim 6, wherein the described set of actions include validating metadata of the resource associated with the provisioning request for conformity to a specific IP address to be assigned.

12. A method of executing a named template in a system as in claim 6, wherein carrying out the described set of actions includes automatically notifying external systems of an IP address assignment of the enterprise network to the resource associated with the provisioning request.

13. A method of executing a named template in a system as in claim 6, wherein the named template has been previously created by:

assigning an identifier to a new unpopulated template, the identifier serving as a template name that can later be invoked in response to one or more provisioning requests;

in a recursive loop, populating the template with descriptions of IP address blocks and sub-blocks together with an associated set of actions to be taken for each block and sub-block in response to a provisioning request, the recursive loop including steps of:
(1) selecting an IP address block or sub-block;
(2) entering a description of a series of one or more actions to be performed with the selected IP address block or sub-block;
(3) saving a selection-action bundle as a unit;

and after completing the recursive loop for all desired IP address blocks and sub-blocks, saving the now-populated template in a database memory.

14. A method of executing a named template in a system as in claim 13, wherein in creating the named template the step of selecting an IP address block or sub block involves one of specifying an exact IP address range and describing attributes of a desired IP address range.

15. A method of executing a named template in a system as in claim 13, wherein in creating the named template the step of entering a description of actions to be performed with a selected IP address block or sub-block comprise any one or more of triggering notification of external systems associated with the network of an IP address assignment, subdivision of the selected IP address block or sub block, assignment of metadata to the selected or subdivided IP address block or sub-block, securing managerial approvals of an IP address assignment, and cross-verifying of IP block suitability for a requesting network resource.

16. A method of executing a named template in a system as in claim 13, wherein in creating the named template the recursive loop is repeated for each IP address range and each sub-range within an IP address range as required by an administrator of an enterprise network.

17. A method of executing a named template in a system as in claim 13, wherein in creating the named template one saved unit of a selection-action bundle in a named template describes an IPv4 address space of a network and another saved unit in the same named template describes an IPv6 address space.

* * * * *